United States Patent
Yehuda et al.

(10) Patent No.: US 10,310,870 B2
(45) Date of Patent: Jun. 4, 2019

(54) METHOD FOR CREATING A REVISED APPLICATION BY ADDING CODE FUNCTIONALITY TO AN EXISTING APPLICATION EXECUTABLE

(71) Applicant: APPDOME LTD., Tel Aviv (IL)

(72) Inventors: Avner Yehuda, Ramat Gan (IL); Omer Schory, Givatayim (IL); Meir Tsvi, Tel Aviv (IL); Daniel Zatuchne, etanya (IL)

(73) Assignee: APPDOME LTD., Tel Aviv (IL)

( * ) Notice: Subject to any disclaimer, the term of this patent is extended or adjusted under 35 U.S.C. 154(b) by 0 days.

(21) Appl. No.: 15/230,524

(22) Filed: Aug. 8, 2016

(65) Prior Publication Data
US 2017/0060565 A1 Mar. 2, 2017

Related U.S. Application Data

(60) Provisional application No. 62/207,740, filed on Aug. 20, 2015.

(51) Int. Cl.
G06F 9/44 (2018.01)
G06F 9/445 (2018.01)

(52) U.S. Cl.
CPC .................. *G06F 9/44521* (2013.01)

(58) Field of Classification Search
CPC ................................ G06F 9/944521
USPC .......................................... 717/168
See application file for complete search history.

(56) References Cited

U.S. PATENT DOCUMENTS

| | | | | |
|---|---|---|---|---|
| 6,023,583 | A * | 2/2000 | Honda | G06F 8/433 711/100 |
| 7,734,689 | B2 * | 6/2010 | Richer | H04L 63/0815 709/203 |
| 8,522,042 | B2 * | 8/2013 | Barron | G06F 21/50 713/189 |
| 8,984,272 | B2 * | 3/2015 | Kohiyama | G06F 21/54 380/277 |
| 9,164,754 | B1 * | 10/2015 | Pohlack | G06F 8/658 |
| 9,177,117 | B2 * | 11/2015 | Kohiyama | G06F 21/10 |
| 2002/0042833 | A1 * | 4/2002 | Hendler | H04L 29/06027 709/231 |
| 2012/0304160 | A1 * | 11/2012 | Soeder | G06F 9/4486 717/148 |
| 2014/0289726 | A1 * | 9/2014 | Rugina | G06F 9/45525 718/1 |

* cited by examiner

*Primary Examiner* — Evral E Bodden
(74) *Attorney, Agent, or Firm* — Fish & Richardson P.C.

(57) ABSTRACT

It is often desired to add or change the functionality of an existing executable, also known as binary.
Simply splicing in new machine code into the binary will not work due to host system-specific and platform-specific limitations.
The present invention will enable adding any new code to an existing program while overcoming the aforementioned consistency limitations and maintaining the original functionality.

17 Claims, 13 Drawing Sheets

RUN TIME EXECUTION EXAMPLE

51 NORMAL EXECUTION

```
00 22            > MOVS  R2, #0
01 F0 ED FE        BL    0x394aa4
42 49              LDR   R1, =0x261B7B
01 b5              push  {r0, lr}        PATCHED BINARY CODE
10 20              mov   r0, #0x10       EXECUTION IN THE VICINITY OF THE PATCH
00 06              lsl   r0, r0, #0x18
00 68              ldr   r0, [r0, #0x4]  THE CODE IN BLACK IS THE ORIGINAL CODE
80 47              blx   r0              THE CODE IN BOLD FONT IS THE OUTGOING
60 68              LDR   R0, [R4,#4]     TRAMPOLINE (a.k.a. PATCH)
01 21              MOVS  R1, #1
```

---

```
00 22              MOVS  R2, #0
01 F0 ED FE      > BL    0x394aa4
42 49              LDR   R1, =0x261B7B
01 b5              push  {r0, lr}
10 20              mov   r0, #0x10
00 06              lsl   r0, r0, #0x18
00 68              ldr   r0, [r0, #0x4]
80 47              blx   r0
60 68              LDR   R0, [R4,#4]
01 21              MOVS  R1, #1
```

---

```
00 22              MOVS  R2, #0
01 F0 ED FE        BL    0x394aa4
42 49            > LDR   R1, =0x261B7B
01 b5              push  {r0, lr}
10 20              mov   r0, #0x10
00 06              lsl   r0, r0, #0x18
00 68              ldr   r0, [r0, #0x4]
80 47              blx   r0
60 68              LDR   R0, [R4,#4]
01 21              MOVS  R1, #1
```

FIG. 3

52 OUTGOING TRAMPOLINE PATCH

```
00 22           MOVS   R2, #0
01 F0 ED FE     BL     0x394aa4        ⎫
42 49           LDR    R1, =0x261B7B   ⎪
01 b5         > push   {r0, lr}        ⎬  OUTGOING TRAMPOLINE
10 20           mov    r0, #0x10       ⎪
00 06           lsl    r0, r0, #0x18   ⎭
00 68           ldr    r0, [r0, #0x4]
80 47           blx    r0
60 68           LDR    R0, [R4,#4]
01 21           MOVS   R1, #1
```

---

```
00 22           MOVS   R2, #0
01 F0 ED FE     BL     0x394aa4
42 49           LDR    R1, =0x261B7B
01 b5           push   {r0, lr}
10 20         > mov    r0, #0x10
00 06           lsl    r0, r0, #0x18
00 68           ldr    r0, [r0, #0x4]
80 47           blx    r0
60 68           LDR    R0, [R4,#4]
01 21           MOVS   R1, #1
```

--- r0=&OffsetTable=0x10000000

OffsetTable
&hook
TRAMPOOLINE

```
00 22           MOVS   R2, #0
01 F0 ED FE     BL     0x394aa4
42 49           LDR    R1, =0x261B7B
01 b5           push   {r0, lr}
10 20           mov    r0, #0x10
00 06         > lsl    r0, r0, #0x18
00 68           ldr    r0, [r0, #0x4]
80 47           blx    r0
60 68           LDR    R0, [R4,#4]
01 21           MOVS   R1, #1
```

```
00 22            MOVS  R2, #0
01 F0 ED FE      BL    0x394aa4
42 49            LDR   R1, =0x261B7B
01 b5            push  {r0, lr}
10 20            mov   r0, #0x10
00 06            lsl   r0, r0, #0x18
00 68          > ldr   r0, [r0, #0x4]     r0=OffsetTable[1]=&incoming₂
80 47            blx   r0
60 68            LDR   R0, [R4,#4]
01 21            MOVS  R1, #1
```

OffsetTable
- &hook TR.
- &hook TR.

prologue_2:
    sub sp, #0x8
    ...
restore_op_1:
    ...
restore_op_2:
    ...
restore_op_M:
    ...
call_2:
    bl fast_inv_sqrt
epilogue_2:
    ...
    bx lr

---

```
00 22            MOVS  R2, #0
01 F0 ED FE      BL    0x394aa4
42 49            LDR   R1, =0x261B7B
01 b5            push  {r0, lr}
10 20            mov   r0, #0x10
00 06            lsl   r0, r0, #0x18
00 68            ldr   r0, [r0, #0x4]
80 47          > blx   r0          ← JUMP TO THE HOOK TRAMPOLINE
60 68            LDR   R0, [R4,#4]
01 21            MOVS  R1, #1
``` prologue_2:
    sub sp, #0x8
    ...
restore_op_1:
    ...
restore_op_2:
    ...
restore_op_M:
    ...
call_2:
    bl fast_inv_sqrt
epilogue_2:
    ...
    bx lr

FIG. 3 (Cont.)

```
00 22              MOVS  R2, #0
01 F0 ED FE        BL    0x394aa4
42 49              LDR   R1, =0x261B7B
01 b5              push  {r0, lr}
10 20              mov   r0, #0x10
00 06              lsl   r0, r0, #0x18
00 68              ldr   r0, [r0, #0x4]
80 47           *  blx   r0
60 68              LDR   R0, [R4,#4]
01 21              MOVS  R1, #1
```

RESTORE STARTING CONTEXT (R0 & LR AND SET UP A LOCAL STACK FRAME)

```
prologue_2:
  > sub sp, #0x8
    ...
  restore_op_1:
    ...
  restore_op_2:
    ...
  restore_op_M:
    ...
  call_2:
    bl fast_inv_sqrt
  epilogue_2:
    ...
    bx  lr
```

---

53 RESTORE STARTING STATUS

```
00 22              MOVS  R2, #0
01 F0 ED FE        BL    0x394aa4
42 49              LDR   R1, =0x261B7B
01 b5              push  {r0, lr}
10 20              mov   r0, #0x10
00 06              lsl   r0, r0, #0x18
00 68              ldr   r0, [r0, #0x4]
80 47           *  blx   r0
60 68              LDR   R0, [R4,#4]
01 21              MOVS  R1, #1
```

RESTORE STARTING CONTEXT (R0 & LR AND SET UP A LOCAL STACK FRAME)

```
prologue_2:
    sub sp, #0x8
  > ...
  restore_op_1:
    ...
  restore_op_2:
    ...
  restore_op_M:
    ...
  call_2:
    bl fast_inv_sqrt
  epilogue_2:
    ...
    bx  lr
```

FIG. 3 (Cont.)

54 EXECUTE REPLACED CODE

```
00 22            MOVS  R2, #0
01 F0 ED FE      BL    0x394aa4
42 49            LDR   R1, =0x261B7B
01 b5            push  {r0, lr}
10 20            mov   r0, #0x10
00 06            lsl   r0, r0, #0x18
00 68            ldr   r0, [r0, #0x4]
80 47          * blx   r0
60 68            LDR   R0, [R4,#4]
01 21            MOVS  R1, #1
```

RESTORE FIRST OVERWRITTEN OPCODE →

```
prologue_2:
    sub sp, #0x8
    ...
restore_op_1:
    > ...
restore_op_2:
    ...
restore_op_M:
    ...
call_2:
    bl fast_inv_sqrt
epilogue_2:
    ...
    bx  lr
```

---

```
00 22            MOVS  R2, #0
01 F0 ED FE      BL    0x394aa4
42 49            LDR   R1, =0x261B7B
01 b5            push  {r0, lr}
10 20            mov   r0, #0x10
00 06            lsl   r0, r0, #0x18
00 68            ldr   r0, [r0, #0x4]
80 47          * blx   r0
60 68            LDR   R0, [R4,#4]
01 21            MOVS  R1, #1
```

RESTORE SECOND OVERWRITTEN OPCODE →

```
prologue_2:
    sub sp, #0x8
    ...
restore_op_1:
    ...
restore_op_2:
    > ...
restore_op_M:
    ...
call_2:
    bl fast_inv_sqrt
epilogue_2:
    ...
    bx  lr
```

FIG. 3 (Cont.)

```
00  22         MOVS   R2, #0
01  F0 ED FE   BL     0x394aa4
42  49         LDR    R1, =0x261B7B
01  b5         push   {r0, lr}
10  20         mov    r0, #0x10
00  06         lsl    r0, r0, #0x18
00  68         ldr    r0, [r0, #0x4]
80  47       * blx    r0
60  68         LDR    R0, [R4,#4]
01  21         MOVS   R1, #1
```

```
prologue_2:
    sub sp, #0x8
    ...
restore_op_1:
    ...
restore_op_2:
    ...
restore_op_M:
    > ...
call_2:
    bl fast_inv_sqrt
epilogue_2:
    ...
    bx  lr
```

RESTORE M<sup>th</sup> OVERWRITTEN OPCODE → restore_op_M

---

55 CALL NEW FUNCTION

```
00  22         MOVS   R2, #0
01  F0 ED FE   BL     0x394aa4
42  49         LDR    R1, =0x261B7B
01  b5         push   {r0, lr}
10  20         mov    r0, #0x10
00  06         lsl    r0, r0, #0x18
00  68         ldr    r0, [r0, #0x4]
80  47       * blx    r0
60  68         LDR    R0, [R4,#4]
01  21         MOVS   R1, #1
```

```c
float fast_inv_sqrt(float x)
{
    float x2 = x * 0.5f;
    long i = *(long *)&x;

i = 0x5f3759df – (i >> 1);
    x = *(float *)&i;
    x = x * (1.5f – x2 * x * x);
    x = x * (1.5f – x2 * x * x);

return x;
}
```

```
prologue_2:
    sub sp, #0x8
    ...
restore_op_1:
    ...
restore_op_2:
    ...
restore_op_M:
    ...
call_2:
    > bl fast_inv_sqrt
epilogue_2:
    ...
    bx  lr
```

CALL THE CUSTOM IMPLEMENTATION → call_2

FIG. 3 (Cont.)

56 EXECUTE NEW FUNCTION

```
00 22              MOVS   R2, #0
01 F0 ED FE        BL     0x394aa4
42 49              LDR    R1, =0x261B7B
01 b5              push   {r0, lr}
10 20              mov    r0, #0x10
00 06              lsl    r0, r0, #0x18
00 68              ldr    r0, [r0, #0x4]
80 47          *   blx    r0
60 68              LDR    R0, [R4,#4]
01 21              MOVS   R1, #1
```

```
float fast_inv_sqrt(float x)
{
>   float x2 = x * 0.5f;
    long i = *(long *)&x;

i = 0x5f3759df – (i >> 1);
    x = *(float *)&i;
    x = x * (1.5f – x2 * x * x);
    x = x * (1.5f – x2 * x * x);

return x;
}
``` prologue_2:
  sub sp, #0x8
  ...
restore_op_1:
  ...
restore_op_2:
  ...
restore_op_M:
  ...
call_2:
  * bl fast_inv_sqrt
epilogue_2:
  ...
  bx  lr

---

```
00 22              MOVS   R2, #0
01 F0 ED FE        BL     0x394aa4
42 49              LDR    R1, =0x261B7B
01 b5              push   {r0, lr}
10 20              mov    r0, #0x10
00 06              lsl    r0, r0, #0x18
00 68              ldr    r0, [r0, #0x4]
80 47          *   blx    r0
60 68              LDR    R0, [R4,#4]
01 21              MOVS   R1, #1
```

```
float fast_inv_sqrt(float x)
{
    float x2 = x * 0.5f;
>   long i = *(long *)&x;

i = 0x5f3759df – (i >> 1);
    x = *(float *)&i;
    x = x * (1.5f – x2 * x * x);
    x = x * (1.5f – x2 * x * x);

return x;
}
``` prologue_2:
  sub sp, #0x8
  ...
restore_op_1:
  ...
restore_op_2:
  ...
restore_op_M:
  ...
call_2:
  * bl fast_inv_sqrt
epilogue_2:
  ...
  bx  lr

FIG. 3 (Cont.)

```
00 22           MOVS  R2, #0
01 F0 ED FE     BL    0x394aa4
42 49           LDR   R1, =0x261B7B
01 b5           push  {r0, lr}
10 20           mov   r0, #0x10
00 06           lsl   r0, r0, #0x18
00 68           ldr   r0, [r0, #0x4]
80 47         * blx   r0                          prologue_2:
60 68           LDR   R0, [R4,#4]                   sub sp, #0x8
01 21           MOVS  R1, #1                        ...
                                                  restore_op_1:
    float fast_inv_sqrt(float x)                    ...
    {                                             restore_op_2:
        float x2 = x * 0.5f;                        ...
        long i = *(long *)&x;                     restore_op_M:
  >     i = 0x5f3759df – (i >> 1);                  ...
        x = *(float *)&i;                         call_2:
        x = x * (1.5f – x2 * x * x);              * bl fast_inv_sqrt
        x = x * (1.5f – x2 * x * x);              epilogue_2:
                                                    ...
        return x;                                   bx  lr
    }
```

```
00 22           MOVS  R2, #0
01 F0 ED FE     BL    0x394aa4
42 49           LDR   R1, =0x261B7B
01 b5           push  {r0, lr}
10 20           mov   r0, #0x10
00 06           lsl   r0, r0, #0x18
00 68           ldr   r0, [r0, #0x4]
80 47         * blx   r0                          prologue_2:
60 68           LDR   R0, [R4,#4]                   sub sp, #0x8
01 21           MOVS  R1, #1                        ...
                                                  restore_op_1:
    float fast_inv_sqrt(float x)                    ...
    {                                             restore_op_2:
        float x2 = x * 0.5f;                        ...
        long i = *(long *)&x;                     restore_op_M:
        i = 0x5f3759df – (i >> 1);                  ...
  >     x = *(float *)&i;                         call_2:
        x = x * (1.5f – x2 * x * x);              * bl fast_inv_sqrt
        x = x * (1.5f – x2 * x * x);              epilogue_2:
                                                    ...
        return x;                                   bx  lr
    }
```

FIG. 3 (Cont.)

```
00 22          MOVS  R2, #0
01 F0 ED FE    BL    0x394aa4
42 49          LDR   R1, =0x261B7B
01 b5          push  {r0, lr}
10 20          mov   r0, #0x10
00 06          lsl   r0, r0, #0x18
00 68          ldr   r0, [r0, #0x4]
80 47        * blx   r0
60 68          LDR   R0, [R4,#4]
01 21          MOVS  R1, #1
``` float fast_inv_sqrt(float x)
{
    float x2 = x * 0.5f;
    long i = *(long *)&x;

i = 0x5f3759df – (i >> 1);
    x = *(float *)&i;
>   x = x * (1.5f – x2 * x * x);
    x = x * (1.5f – x2 * x * x);

return x;
} prologue_2:
    sub sp, #0x8
    ...
restore_op_1:
    ...
restore_op_2:
    ...
restore_op_M:
    ...
call_2:
  * bl fast_inv_sqrt
epilogue_2:
    ...
    bx  lr

---

```
00 22          MOVS  R2, #0
01 F0 ED FE    BL    0x394aa4
42 49          LDR   R1, =0x261B7B
01 b5          push  {r0, lr}
10 20          mov   r0, #0x10
00 06          lsl   r0, r0, #0x18
00 68          ldr   r0, [r0, #0x4]
80 47        * blx   r0
60 68          LDR   R0, [R4,#4]
01 21          MOVS  R1, #1
``` float fast_inv_sqrt(float x)
{
    float x2 = x * 0.5f;
    long i = *(long *)&x;

i = 0x5f3759df – (i >> 1);
    x = *(float *)&i;
    x = x * (1.5f – x2 * x * x);
>   x = x * (1.5f – x2 * x * x);

return x;
} prologue_2:
    sub sp, #0x8
    ...
restore_op_1:
    ...
restore_op_2:
    ...
restore_op_M:
    ...
call_2:
  * bl fast_inv_sqrt
epilogue_2:
    ...
    bx  lr

FIG. 3 (Cont.)

57 RETURN FROM NEW FUNCTION

```
00 22           MOVS  R2, #0
01 F0 ED FE     BL    0x394aa4
42 49           LDR   R1, =0x261B7B
01 b5           push  {r0, lr}
10 20           mov   r0, #0x10
00 06           lsl   r0, r0, #0x18
00 68           ldr   r0, [r0, #0x4]
80 47         * blx   r0
60 68           LDR   R0, [R4,#4]
01 21           MOVS  R1, #1 float fast_inv_sqrt(float x)
   {
      float x2 = x * 0.5f;
      long i = *(long *)&x;

i = 0x5f3759df – (i >> 1);
      x = *(float *)&i;
      x = x * (1.5f – x2 * x * x);
      x = x * (1.5f – x2 * x * x);

> return x;
   }
```

```
prologue_2:
   sub sp, #0x8
   ...
restore_op_1:
   ...
restore_op_2:
   ...
restore_op_M:
   ...
call_2:
 * bl fast_inv_sqrt
epilogue_2:
   ...
   bx  lr
```

---

58 JUMP BACK TO THE ORIGINAL CODE AFTER PATCH

```
00 22           MOVS  R2, #0
01 F0 ED FE     BL    0x394aa4
42 49           LDR   R1, =0x261B7B
01 b5           push  {r0, lr}
10 20           mov   r0, #0x10
00 06           lsl   r0, r0, #0x18
00 68           ldr   r0, [r0, #0x4]
80 47         * blx   r0
60 68           LDR   R0, [R4,#4]
01 21           MOVS  R1, #1
```

```
prologue_2:
   sub sp, #0x8
   ...
restore_op_1:
   ...
restore_op_2:
   ...
restore_op_M:
   ...
call_2:
   bl fast_inv_sqrt
epilogue_2:
 > ...
   bx  lr
```

RESTORE POST-EXECUTION CONTEXT (UNWIND STACK, RESTORE REGISTERS)

FIG. 3 (Cont.)

```
00 22            MOVS  R2, #0
01 F0 ED FE      BL    0x394aa4
42 49            LDR   R1, =0x261B7B
01 b5            push  {r0, lr}
10 20            mov   r0, #0x10
00 06            lsl   r0, r0, #0x18
00 68            ldr   r0, [r0, #0x4]
80 47          * blx   r0
60 68            LDR   R0, [R4,#4]
01 21            MOVS  R1, #1
``` prologue_2:
    sub sp, #0x8
    ...
restore_op_1:
    ...
restore_op_2:
    ...
restore_op_M:
    ...
call_2:
    bl fast_inv_sqrt
epilogue_2:
    ...
  > bx  lr

JUMP BACK TO THE ORIGINAL EXECUTION FLOW

---

59 NORMAL EXECUTION

```
00 22            MOVS  R2, #0
01 F0 ED FE      BL    0x394aa4
42 49            LDR   R1, =0x261B7B
01 b5            push  {r0, lr}
10 20            mov   r0, #0x10
00 06            lsl   r0, r0, #0x18
00 68            ldr   r0, [r0, #0x4]
80 47            blx   r0
60 68          > LDR   R0, [R4,#4]
01 21            MOVS  R1, #1
```

EXECUTION FLOW IS RESTORED TO THE ORIGINAL CODE, RIGHT AFTER THE PATCH

---

```
00 22            MOVS  R2, #0
01 F0 ED FE      BL    0x394aa4
42 49            LDR   R1, =0x261B7B
01 b5            push  {r0, lr}
10 20            mov   r0, #0x10
00 06            lsl   r0, r0, #0x18
00 68            ldr   r0, [r0, #0x4]
80 47            blx   r0
60 68            LDR   R0, [R4,#4]
01 21          > MOVS  R1, #1
```

FIG. 3 (Cont.)

METHOD FOR CREATING A REVISED APPLICATION BY ADDING CODE FUNCTIONALITY TO AN EXISTING APPLICATION EXECUTABLE

BACKGROUND

It is often required to add functionality to existing applications—for example security. in many cases it is required to add functionality at a certain point in the subject application, it is impossible to run a separate application before or after the subject application, and this is possible today only by rewriting the code, as explained here. CPUs and other processing code engines operate by executing machine code. This machine code, which is generally referred to as binary code, or by the shorthand binary, is usually the result of a compilation of higher-level languages.

In addition, most platforms come with an operating system which requires that machine code which is to be executed on the platform must come packed in some sort of container which dictates the layout of the binary. It is one of the tasks of the compiler to package the resulting machine code into the container. The container is sometimes referred to as an object file.

It is often desired to modify or enhance the function of an existing object file by splicing or appending new machine code to the object file. Changing code is relatively simple but adding a new functionality is a problem.

This proves impossible due to two factors:
1. Modifications applied to source code are not applicable in the output of a compiler.
2. The structure of object files does not allow room for adding new code.

Specifically adding a code will not allow a position dependent code (SP, PC) to continue operating properly

SUMMARY

Figure 1:
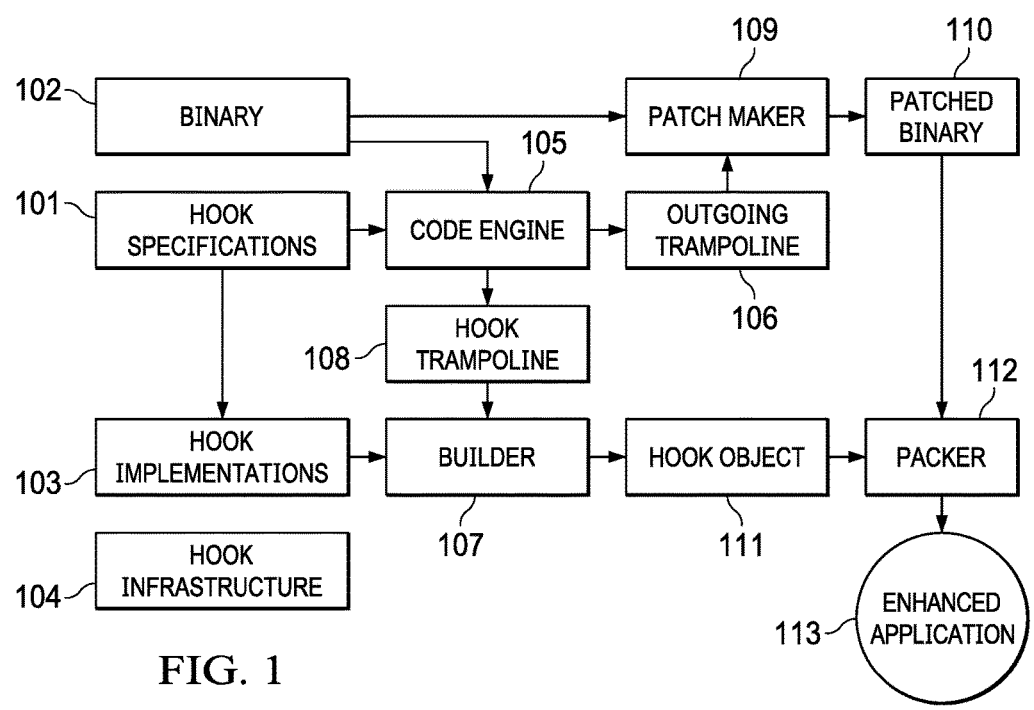
FIG. 1 describes the patch process (offline)

The invention is about enabling adding one or more library object codes to existing code while maintaining its existing correct functionality. A preparation to the invention process it is determined at which addresses of the object code new functionality should be inserted and the new functionalities determined. An additional object file (henceforth hook object) is loaded into the same memory space as the original object file.

The original object file is modified a-priori by patching it with snippets of machine code (henceforth outgoing trampoline) which act as a bridge by which the original object file's machine code can branch to the additional hook object file's machine code.

A code called Hook trampoline will be prepared. It will include the code which allows maintaining the old code functionality and a jump to the hook object.

The outgoing trampoline will jump in a described process to this code.

DETAILED DESCRIPTION

The described method has four phases:
1. Preparation
2. Building the new code by patching the original object code
3. Loading the new code
4. Running the new code The first two steps can be done off line on another processing device:

The new code can replace an existing code or add a new functionality. Replacing a code is simple—just providing a new branch address. The invention is focused on adding new functionality, and several functions can be added.

The elements described in this document are as follows: Hook specification 101, Code engine 105, Binary 102, Hook trampoline, 106, Hook implementations 103. Builder 107. Hook infrastructures. 104 hook object. 111 Outgoing trampolines. 108 Patch maker. 109 Patched binary. 110, Packer 112, Patched application 113 The preparation is about preparing the new functions and deciding where to insert them in the existing binary. This will be described in the hook specification.

FIG. 1 Build Process

FIG. 1 explains the build step. The process will be done by a tool. The process can be repeated per function added to the original code.

The tool elements are:
1. The code engine which prepares new code
2. The builder which will compile the hook trampoline, hook implementation (as selected by indications from the hook specifications) and hook infrastructure together
3. The patch maker which will modify the existing binary code
4. The packer which will pack together the modified binary, potentially with several modifications together with one or more hook objects to form the new application.

The existing code elements are ingredients to process are:
1. Binary (102): An object file on which the modifications are performed.
2. Hook implementations (103): One or more Source code elements of the new or modified functionality implemented in a high level language
3. Hook specification (101): A mapping of functions from the hook implementations (103) to locations in the binary (102) and an indication of which hook implementation to pick
4. Hook infrastructure (104): Source code of a constant mechanism which forms the runtime of the hooking method.

The generated code elements are:
1. Outgoing trampoline which will perform the jump to the new functionality
2. Hook trampoline which will guarantee continued correct existing code execution
3. Hook object—the hook code after compilation of the hook implementation and the hook infrastructure together with the hook trampoline which will form the new code to be executed
4. Patched binary. The binary with the outgoing trampoline inside
5. Patched application—the new code with the added functions.

The code engine (105) forms the core of the build phase. It takes the binary (102) and the hook specification (101) and generates two elements:

1. Outgoing trampolines (108): A series of machine instructions which access the offset table, retrieve an address from there and branch to that address. As such there is one outgoing trampoline per mapping in the hook specification (101). The outgoing trampoline will also incorporate the jump address 204 to the hook object, as explained later.

2. Hook trampoline (106): A series of machine instructions which form the glue between the outgoing trampoline (108) and the hook implementation (103). Again, there is one hook trampoline per entry in the hook specification (101). The purpose of this function is to guaranteed correct operation of the full code after the jump and return from the hook object code. Several tasks will be performed {part of it will run before the new function and part of it after.

a. Set up a working stack frame for all the following tasks b. Since the outgoing trampoline (108) modifies the host machine's registers in order to perform the offset table access and branch, the hook trampoline makes sure that the registers contain their original values in preparation for task c c. Since the outgoing trampoline (108) overwrites a chunk of machine instructions they need to be executed. However, since the state of the machine has been inevitably modified, first by task a, which modifies the SP (=Stack Pointer) and secondly by the fact that the address at which the code executes (PC=Program Counter) is no longer that at which the machine instructions were originally, requires the emulation of these instructions, i.e. executing en equivalent series of instructions which have the same effect on the memory/registers as if PC/SP were in their intended state.

d. Branching to the compiled machine code of the corresponding Hook implementation (103).

e. Wrapping up the working stack frame f. Branching back to the binary (102) right after the end of the outgoing trampoline (108) in a way that does not modify the machine's state.

The patch maker (109) takes the binary (102) and patches it with the outgoing trampolines (108) which results in the patched binary (110).

The builder (107) will compile together the hook trampolines (106), hook implementations (103) and hook infrastructure (104)

It will organize the code such that part of the hook trampoline will execute before the new function and part of it after all compiled together into a single object file called hook object (111).

The packer (112) takes the patched binary (110) and the hook objects (111) and makes sure they are structures so that the host system loads them together. The resulting patched application (112) is ready to be installed and run on the host system.

Figure 2A:
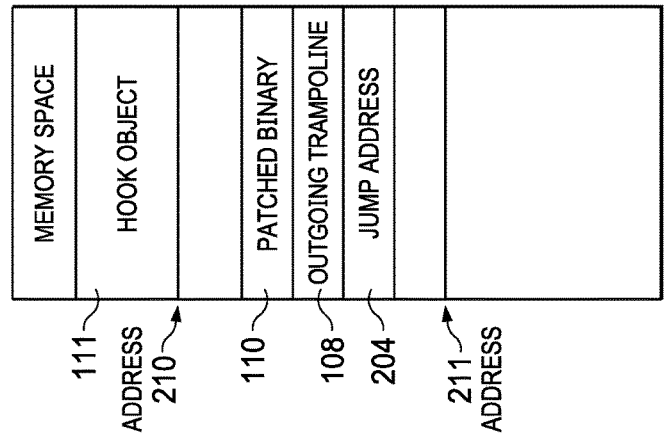
FIG. 2a describes the memory view after the system loads the object file
Figure 2B:
FIG. 2b describes the memory view after the offset table is allocated
Figure 2C:
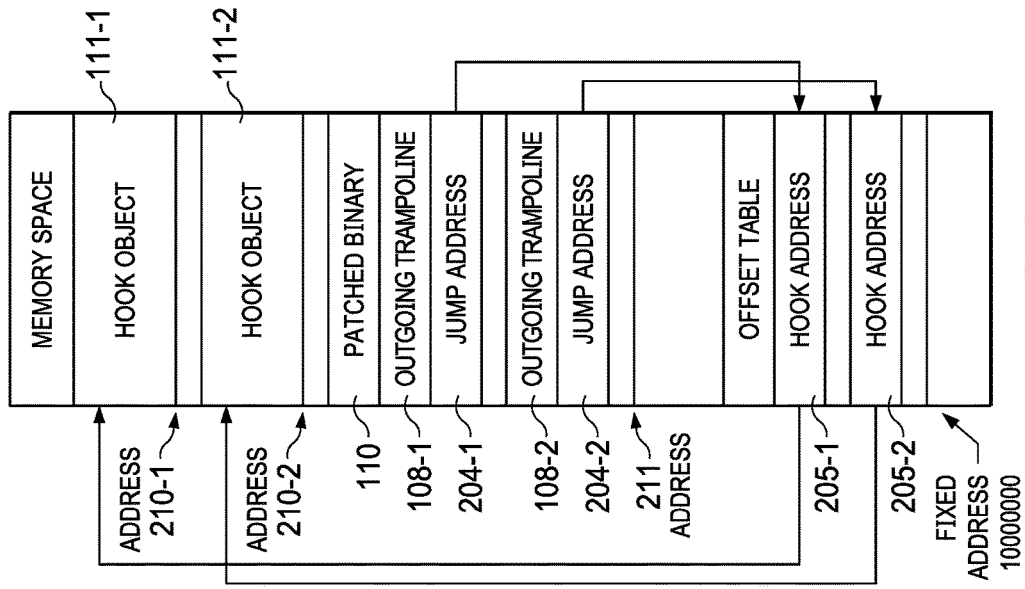
FIG. 2c describes the memory view of the final memory state

FIGS. 2a through 2c describe the memory layout of the process during the various phases FIG. 2a—Memory View After the System Loads the Binaries of the New Application.

The OS loader will load the patched application 113. The hook object 111 (which incorporates the complied hook implementation, infrastructure and trampoline) at address 210 and the patched binary (which incorporates the outgoing trampoline) 110 at address 111. These locations will be known only at load time and will change from one run to the other.

FIG. 2b—Memory View After the Offset Table is Allocated

In FIG. 2b, after the OS loaded the patched binary (110) and hook object (111) into memory, the hook object's (111) initialization maps the offset table (205) in a known fixed address fixed address: 0x10000000

It will serve as a table of pointers to the hook objects. A direct jump to the hook object is not possible as this address will vary every OS load.

FIG. 2c—Memory View of the Final Memory State

Figure 3:
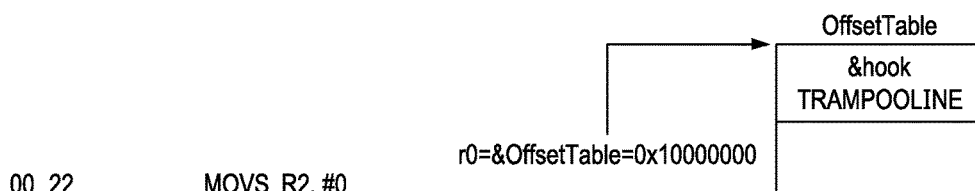
FIG. 3 is a run-time code example

In FIG. 2c, the final image of the memory can be seen for 2 added function code: At the offset table at the two addresses 204 of the offset table pointed by the outgoing trampolines there will be put the two addresses of the hook trampolines 208 FIG. 3 describes the run time process using a code example.

The process will include:
1. Normal execution
2. Jump to address 204
3. Pick up address 208 and jump to it
4. Execute hook trampoline (108) preparation code
5. Execute replaces code emulation
6. Execute new function/hook implementation (103)
7. Execute status resumption
8. Return
9. Resume normal execution.
   The above can be performed several times for several new functions
   This is described in FIG. 3.
51. Normal execution
52. Outgoing trampoline
a. Status saving
b. Loading hook trampoline address from the offset table 205
c. Jumping to it.
53. Restore starting status for replaced code
54. Execution of replaced code.
55. Calling the new function/hook implementation (103)
56. New function execution/hook implementation (103), in this example fast inverse sqrt.
57. Return from new function
58. Return to normal code
59. Normal code execution.

The above method allows adding a new function or replacing a code for any existing code in any operating system.

What we claim is:

1. A method comprising:
   obtaining, by a processor, a first binary of a software application, the first binary configured to perform a first set of functions;
   patching, by the processor, the first binary with an outgoing trampoline, and the outgoing trampoline configured for jumping to a hook object that performs a second set of functions that are different than the first set of functions;
   generating, by the processor, a hook trampoline, the hook trampoline configured to execute instructions in the first binary that were overwritten by the outgoing trampoline and to maintain a state of a machine before a jump to the hook object, wherein the machine is a machine that executes a second binary of the software application that includes the hook trampoline;
   generating, by the processor, the hook object including the hook trampoline, a hook implementation and a hook infrastructure;
   loading, by the processor into a memory space, the patched first binary, the hook object and an offset table, the offset table including a hook address that is referenced by a jump address executed by the outgoing trampoline, the hook address referencing a location of the hook object in the memory space; and generating, by the processor, the second binary for the software application by combining the patched first binary and the hook object, the second binary configured to perform the first set of functions and the second set of functions, wherein the second binary is a new binary for the software application.

2. The method of claim 1, wherein the second set of functions are in addition to the first set of functions.

3. The method of claim 1, wherein the hook object is configured to map the offset table to fixed address in the memory space.

4. The method of claim 1, wherein the outgoing trampoline and the hook trampoline are generated from a hook specification, and the hook specification maps a function in the second set of functions to a location in the first binary.

5. The method of claim 1, wherein the hook trampoline is configured to maintain the machine state by storing register contents in a stack structure prior to executing the hook object, and then retrieving the register contents from the stack after the hook object has executed.

6. The method of claim 5, wherein the register contents include at least one of a stack pointer or a program counter.

7. The method of claim 1, wherein the offset table is a table of pointers to hook objects.

8. The method of claim 1, wherein the hook infrastructure includes compiled source code that forms a runtime code of a hooking method.

9. An apparatus comprising:
one or more processors;
memory coupled to the one or more processors and configured to store instructions that when executed by the one or more processors, cause the one or more processors to perform operations comprising:
obtaining a first binary of a software application, the first binary configured to perform a first set of functions;
patching the first binary with an outgoing trampoline, the outgoing trampoline including a jump address;
generating a hook trampoline, the hook trampoline configured to execute instructions overwritten by the outgoing trampoline in the first binary and to maintain a machine state associated with the overwritten instructions before a jump to a hook object;
generating the hook object including the hook trampoline code, a hook implementation and a hook infrastructure, the hook implementation including one or more compiled source code elements implementing a second set of functions;
loading, into a memory space, the patched first binary and the hook object and an offset table, the offset table including a hook address that is referenced by the jump address, the hook address referencing a location of the hook object in the memory space; and
generating a second binary for the software application by combining the patched first binary and hook object, the second binary configured to perform the first set of functions and the second set of functions, wherein the second binary is a new binary for the software application.

10. The apparatus of claim 9, wherein the second set of functions are in addition to the first set of functions.

11. The apparatus of claim 9, wherein the hook object is configured to map the offset table to fixed address in the memory space.

12. The apparatus of claim 9, wherein the outgoing trampoline and the hook trampoline are generated from a hook specification, and the hook specification maps a function in the second set of functions to a location in the first binary.

13. The apparatus of claim 9, wherein the hook trampoline is configured to maintain the machine state by storing register contents in a stack structure prior to executing the hook object, and then retrieving the register contents from the stack after the hook object has executed.

14. The apparatus of claim 13, wherein the register contents include at least one of a stack pointer or a program counter.

15. The apparatus of claim 9, wherein the offset table is a table of pointers to hook objects.

16. The apparatus of claim 9, wherein the hook infrastructure includes compiled source code that forms a runtime code of a hooking method.

17. A method comprising:
executing, by a processor, a binary of a software application stored in memory, the binary including an outgoing trampoline, a hook object including a hook trampoline and an offset table including a hook address referencing a location of the hook object in the memory;
executing, by the processor, a portion of the binary to perform a first function;
executing, by the processor, the outgoing trampoline, the executing including obtaining the hook address from the offset table, and jumping to the location of the hook object in memory referenced by the hook address;
executing, by the processor, the hook trampoline in the hook object, the executing including storing a state of the processor prior to executing the outgoing trampoline, executing instructions overwritten by the outgoing trampoline, executing instructions in the hook object to perform a second function different than the first function, and responsive to a return from the hook object, restoring the state of the processor that existed prior to the execution of the outgoing trampoline.

* * * * *